Nov. 14, 1950     A. M. CAMPANELLI     2,530,225
CAM ACTUATED CLAMP
Filed Jan. 21, 1949
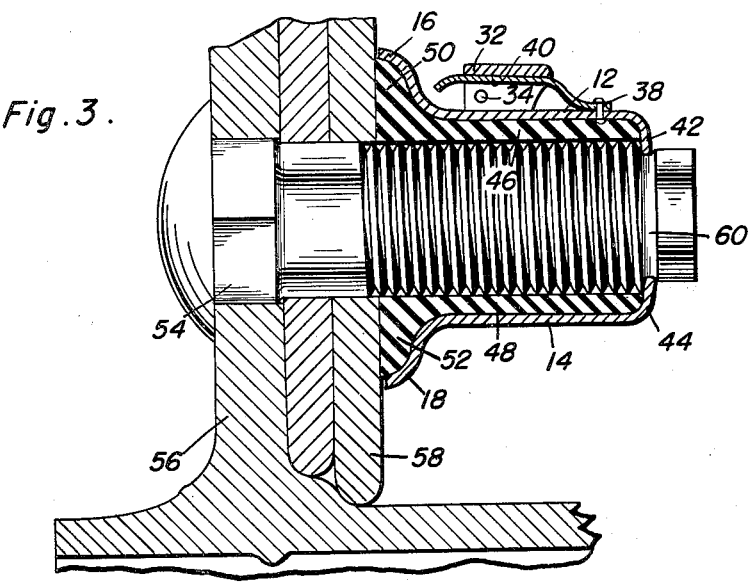
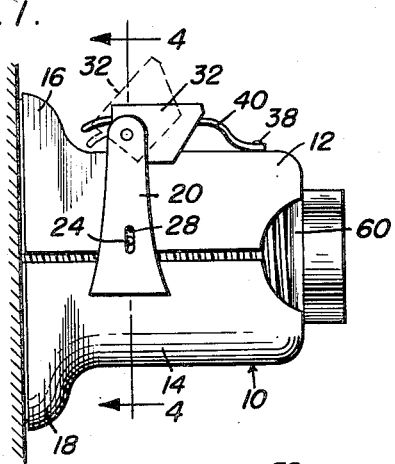
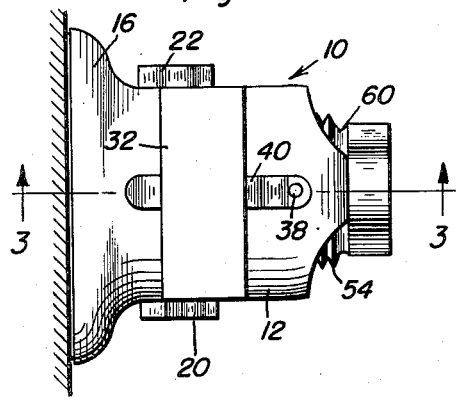
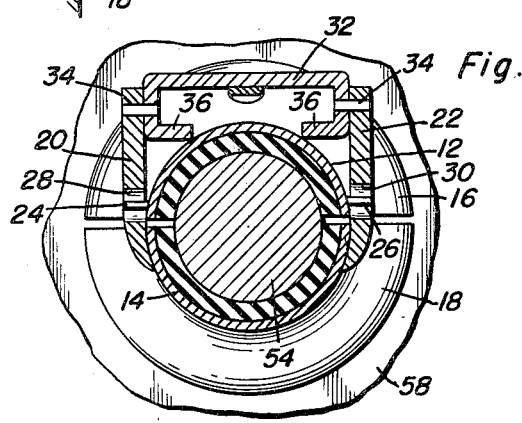
Anthony M. Campanelli
INVENTOR.

Patented Nov. 14, 1950

2,530,225

UNITED STATES PATENT OFFICE 2,530,225

CAM ACTUATED CLAMP

Anthony M. Campanelli, New York, N. Y.

Application January 21, 1949, Serial No. 71,784

9 Claims. (Cl. 85—36)

This invention relates to new and useful improvements in clamps and the primary object of the present invention is to provide a cam actuated clamp for use as a lock nut.

Another important object of the present invention is to provide a clamp including a pair of semi-cylindrical members that are slidably connected together for gripping the outer surface of a bolt, a pivotal cam held in position to said members and embodying novel and improved means forcing the cam against one of said members for yieldingly retaining the members clamped to a bolt.

A further object of the present invention is to provide a cam actuated clamp including a split sleeve having inwardly extending gripping jaws at one end for reception in an annular groove provided in the outer periphery of a bolt to retain the present clamp relative to the bolt against longitudinal movement thereon.

A still further aim of the present invention is to provide a cam actuated clamp that is simple and practical in construction, strong and reliable in use, small and compact in structure, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a vehicle wheel assembly and showing the present invention applied thereto, and with dotted lines showing the position of the cam member when the same is unlocked;

Figure 2 is a top plan view of Figure 1;

Figure 3 is a longitudinal vertical sectional view taken substantially on the plane of section line 3—3 of Figure 2; and, Figure 4 is an enlarged transverse vertical sectional view taken substantially on the plane of section line 4—4 of Figure 1.

Referring now to the drawings in detail, wherein for the purpose of illustration, there is disclosed a preferred embodiment of the present invention, the numeral 10 represents a split sleeve or bolt embracing member generally, including a pair of substantially semi-cylindrical sections 12 and 14 having outwardly flared inner end portions 16 and 18.

A pair of spaced parallel, supporting arms 20 and 22 are fixed by welding or the like to the outer periphery of the section 14, at the transverse center of the section 14, and project laterally from the section 14 to prevent endwise movement of the sections 12 and 14 relative to each other.

Laterally projecting pins 24 and 26 are fixed to the section 12 and are slidably received in slots 28 and 30 provided in the arms 20 and 22.

The numeral 32 represents a channel-shaped cam member the legs of which are pivoted as at 34 to the free ends of the arms 20 and 22 so that the cam member is disposed transversely of and spaced from the section 12. The legs of the cam member 32 are turned inwardly to provide bearing flanges or cam surfaces 36 for bearing against the outer periphery of the section 12.

Fixed by a rivet or the like 38 to the section 12, is one end of an elongated spring member or spring steel arm 40 having an intermediate portion that yieldingly bears against the web of the cam member 32 to force the flanges 36 against the section 12 and the section 12 toward the section 14.

The outer ends of the sections 12 and 14 are provided with inturned extensions or diametrically opposed gripping jaws 42 and 44 for a purpose which will later be more fully apparent.

Suitably fixed to the inner peripheries of the sections 12 and 14, is a pair of resilient, semi-cylindrical gripping members 46 and 48 having enlarged ends 50 and 52 that conform to the curvature of the ends 16 and 18 of the sections. The outer ends of the resilient members 46 and 48 abut the inner surfaces of the jaws 42 and 44.

In practical use of the present invention, the members 46 and 48 and sections 12 and 14 are slipped onto a bolt or threaded stud of a wheel assembly or the like 56 with the cam member 42 raised as shown in dotted lines in Figure 1 until the ends 50 and 52 of the members 46 and 48 abut the outer face plate or hub 58 of the wheel assembly whereupon the cam member is released and the spring 40 will clamp the sections 12 and 14 to the bolt 54. When the instant clamp is applied to the bolt, the jaws 42 and 44 are received in an annular groove 60 in the outer end of said bolt to prevent longitudinal movement of the clamp relative to the bolt.

It should be noted, that the resilient members 46 and 48 furnish the desired gripping action since the same receive the threads of the bolt 54 thereby preventing rotary movement of the instant clamp relative to the bolt 54. The ends 50 and 52 of the members 46 and 48 bearing against the plate 58 also prevent rotary movement of the clamp and the bolt 54.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A cam actuated clamp comprising a sleeve having a longitudinal slot, means slidably connecting the portions of the sleeve immediately adjacent the slot, a cam pivoted on said connecting means engaging the sleeve to contract the same, and means holding the cam locked against the sleeve.

2. The combination of claim 1 wherein said sleeve includes an inturned end portion for reception in an annular groove provided in a bolt embraced by the sleeve.

3. The combination of claim 1 and a resilient gripping surface embraced by said sleeve.

4. The combination of claim 1 wherein said last mentioned means includes a spring member fixed to said sleeve and having a free end abutting said cam.

5. A cam actuated clamp comprising a split sleeve, a channel shaped cam member, means carried by the sleeve pivotally supporting said cam, and a spring arm carried by said sleeve, the free end of said spring arm yieldingly engaging the web of said channel shaped cam member to urge the leg portions of said cam member against said sleeve.

6. A cam actuated clamp comprising a sleeve having a longitudinal slot therein, said sleeve including a pair of portions adjacent said slot, a support fixed to one of said portions, a pin carried by the other of said portions, said support having a slot receiving said pin, a cam pivoted on said support, and spring means urging said cam against said sleeve.

7. A cam actuated clamp comprising a pair of complemental, semi-cylindrical members, a pair of supporting arms fixed to and projecting laterally from one of said members, pins fixed to the remaining of said members, said supporting arms having slots slidably receiving said pins, a channeled member having its legs pivoted to the outer ends of said arms, the legs of said channeled member being turned inwardly to provide bearing portions, and a spring member fixed to one of said semi-cylindrical members and bearing against the web of said channeled member.

8. The combination of claim 7 and a resilient sleeve embraced by said semi-cylindrical members.

9. The combination of claim 7 wherein said semi-cylindrical members include inturned gripping jaws.

ANTHONY M. CAMPANELLI.

REFERENCES CITED

The following references are of record in the file of this patent:

UNITED STATES PATENTS

| Number | Name | Date |
|---|---|---|
| 808,954 | Thompson | Jan. 2, 1906 |
| 1,130,475 | Campbell | Mar. 2, 1915 |
| 1,406,293 | Sloane | Feb. 14, 1922 |
| 2,367,480 | Beswick | Jan. 16, 1945 |
| 2,463,235 | Andrews | Mar. 1, 1949 |